Sept. 29, 1942. C. B. MERRY Re. 22,186

INTERNAL COMBUSTION ENGINE

Original Filed Oct. 15, 1938

Inventor

Clayton B. Merry

By

John W. Maupin

Attorney

Reissued Sept. 29, 1942

Re. 22,186

UNITED STATES PATENT OFFICE 22,186

INTERNAL COMBUSTION ENGINE

Clayton B. Merry, Seattle, Wash., assignor, by mesne assignments, to Thomas R. Arden Original No. 2,194,863, dated March 26, 1940, Serial No. 235,119, October 15, 1938. Application for reissue March 18, 1942, Serial No. 435,250

5 Claims. (Cl. 123—47)

My invention relates to internal combustion engines, and the primary objects of the invention are to provide an engine consisting of a piston which is both slidably and revolubly mounted on a carrier cage that is reciprocated by the connecting rod, and whereby the piston and its carrier cage serve as a valve to control and regulate the entry of fuel into the engine and its combustion chamber.

This arrangement materially simplifies the construction of the engine by the elimination of by-pass and valve parts, makes the engine entirely concentric and symmetrical whereby equal expansion and contraction takes place in all directions, increases its efficiency by providing a more direct fuel flow, and causes both the wear of the piston and cylinder to be uniform by reason of the revoluble mounting of the piston on the carrier cage.

Figure 1:
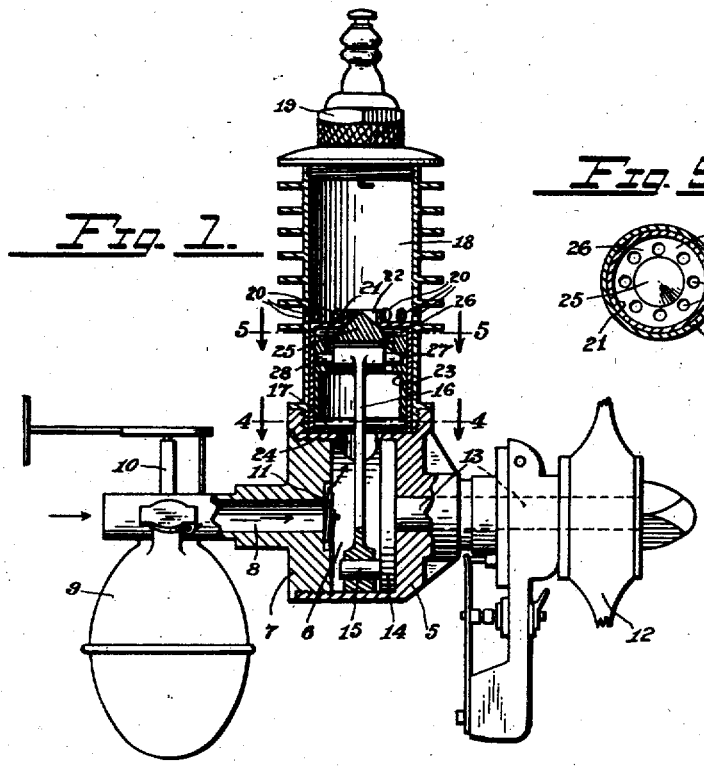
Figure 1 is a view in central, longitudinal vertical section of the engine, with parts shown in elevation.
Figure 5:
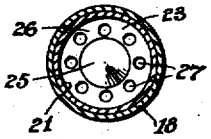
Fig. 5 is a corresponding view taken on a broken line 5—5 of Fig. 1.

Referring in detail to the drawing wherein like reference numerals indicate like parts in the several views, the numeral 5 designates the base of the engine which is provided with a crank case compartment 6. A head 7 is threaded into one end of this compartment and is provided with a conduit 8. A fuel tank 9 is connected to said conduit and a needle valve 10 in cooperative arrangement therewith serves as a carburettor for the fuel supply. Entry of the fuel into the crank case is controlled by a flap valve 11 which restricts the conduit 8.

Figure 4:
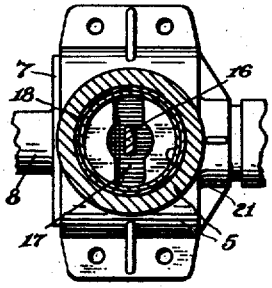
Fig. 4 is a view in horizontal section taken on a broken line 4—4 of Fig. 1.

A propeller 12 is rotated by a shaft 13 which is journaled through the other end wall of the crank case 6 and engine base 5, and in alignment with the conduit 8. A disc crank 14 is fixed to the inner end of said shaft and rotates within said crank case and against said end wall. A crank pin 15 is eccentrically fixed to said disc crank, and the lower end of a connecting rod 16 is journaled to said crank pin. This connecting rod extends upward through an opening 17 in the top of the crank case and said opening is elongated, as shown in Fig. 4, to allow for reciprocative swing of the connecting rod.

A cylinder 18 has its lower end threaded into the top of the engine base 5 concentric with the opening 17 and connecting rod 16. The top of this cylinder is closed by a spark plug 19 threaded thereinto. A series of evenly spaced exhaust ports or holes 20 is distributed around the cylinder intermediate of its ends. A hollow piston 21 is slidably and revolubly mounted within the cylinder 18. The top of said piston is provided with a concentric opening that is defined by an upwardly projecting flange 22.

Figure 3:
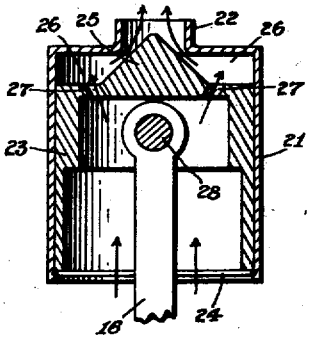
Fig. 3 is an enlarged detail view in central vertical section of the piston and its carrier cage.

The piston 21 is slidably and revolubly mounted on a hollow carrier cage 23. This carrier cage fits snugly into the piston and terminates short of its top and bottom ends. Its downward slidable movement is limited by a retainer ring 24 that is set into a groove around the lower inner edge portion of the piston as most clearly shown in Fig. 3 of the drawing. The top of the carrier cage is preferably, though not necessarily, provided with a conical protuberance forming a cut-off valve member 25. This protuberance projects into the flanged opening 22 of the piston 21, and its impingement against the bottom of said opening limits the upward slidable movement of the carrier cage 23 with respect to the piston 21, thus providing an annular chamber 26 between the tops of said carrier cage and piston. It also serves as a closure for the flow of fuel as more fully hereinafter set forth. A series of evenly spaced holes 27 extend through the top of the carrier cage around and close to the base of the conical protuberance for passage of the fuel. The upper end of the connecting rod 16 extends into and is pivotally connected to the upper portion of the carrier cage by a wrist pin 28 whose ends are journaled into the wall thereof.

Figure 2:
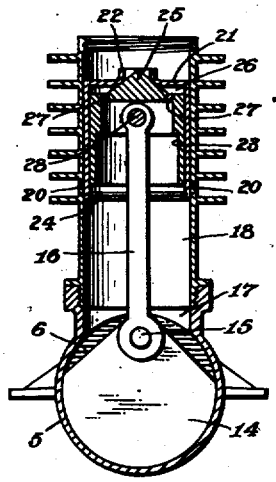
Fig. 2 is a view in central transverse vertical section of the same.

This engine is of the two cycle type wherein the intake, compression, firing and exhausting is carried out during the upward and downward strokes of the piston. Exhaustion is completed at the limit of the downward stroke as shown in Fig. 1, and firing takes place at the limit of the upward stroke as shown in Fig. 2. In other words, the downward stroke combines both the power and exhaust strokes, and the upward stroke combines both the intake and compression strokes. At the limit of the downward stroke the top of the piston just clears the bottom edges of the exhaust ports or holes 20, and at the limit of the upward stroke the bottom portion of said piston completely covers said ports.

In the operation of the engine, referring particularly to Fig. 1 and assuming that the piston 21 has started on the upward stroke, fuel is sucked in through the conduit 8 and flap valve 11 and passes upward through the crank case 6 and opening 17, filling the hollow carrier cage 23, and some of it passing upward through the holes 27 in the top of the carrier cage, and filling the annular chamber 26 between the tops of the piston and carrier cage. The incoming fuel can go no further and is stopped by engagement of the conical protuberance 25 with the bottom of the flanged opening 22 whereby said opening is completely closed. This opening is kept tightly closed throughout the upward stroke by two opposing forces, namely that of the upwardly moving carrier cage against the downward pressure of the preceding fuel charge in the combustion portion of the cylinder, or by the compressed air therein when first starting the engine.

Upon reaching the limit of the upward stroke, as shown in Fig. 2, explosion takes place, and the greater downward force of the expanding gas in the combustion portion of the cylinder against the lesser resistance of the incoming fuel charge keeps the opening 22 still tightly closed on the downward stroke of the piston 21. During this downward stroke the pressure within the combustion chamber rapidly decreases due to the expanding fuel charge. At the same time, the pressure within the fuel intake portion of the cylinder below the piston and also in the crank case 6 rapidly increases due to compression of the piston and the fact that the flap valve 11 is closed. Now, when the top of the piston 21 reaches the exhaust ports 20, the pressure within the upper portion of the cylinder is suddenly released as the burnt gases pass out through said exhaust ports. At this time, the greater and controlling pressure below the piston and within the small chamber 26 greatly retards the downward movement of the piston 21. This allows the carrier cage 23 to be momentarily pulled down and away from the top wall of the piston by the connecting rod 16 acting through the wrist pin 28, as most clearly shown in Fig. 3, it being understood that said carrier cage is pulled away from the top of the piston for only a fraction of a second, or while the top of the piston is moving down and up the short distance defined by the height of the exhaust ports. The carrier cage 23 slides down until its bottom nearly reaches the retainer ring 24, thus creating a passage between the upper conical protuberance 25 and the flanged opening 22 at the top of the piston. The compressed charge of fuel below then rushes up through the spaced holes 27 of the carrier cage and through the opening 22 into the combustion portion of the cylinder. The flange of said opening concentrates the upward charge of fuel and keeps it away from the exhaust ports 20 until the scavenging of the burnt gas above is completed. Almost simultaneously the carrier cage is raised by the upward stroke of the connecting rod 16 whereby the aforesaid passage is closed and the foregoing described cycle of operations is repeated. It will thus be seen that the charge of fuel into the combustion chamber is controlled by the difference or relative variation of pressure between the base and combustion chambers, and not by mechanical means.

The construction of this engine, as set forth in the foregoing description, is simple and economical. There are no by-passes on the side to cause unequal expansion or contraction, the exhaust ports are equally and concentrically disposed around the entire cylinder, and there are no delicate valve parts to get out of order. Furthermore, the concentric symmetrical construction herein described, in addition to eliminating unequal expansion, provides a direct upward flow of fuel thereby increasing the efficiency of the engine. Mounting of the piston on the carrier cage so that it is free to revolve in a horizontal direction equalizes both the wear of the piston and cylinder and prevents vertical scoring. The herein described fuel valve, consisting of the piston and carrier cage cooperatively arranged, cannot open until the pressure within the base portion of the engine is greater than the pressure within its combustion portion, and this occurs during the exhaust period. This engine is primarily intended for use on small or model airplanes, for outboard motors, and other small uses to which it is adapted, although it is not limited in this respect.

I claim:

1. In a two cycle internal combustion engine, a cylinder, a hollow piston axially reciprocable therein and having in the top thereof a fuel inlet port to the cylinder, a carrier cage axially reciprocable within said piston and having in its top a fuel inlet port to the interior of the outer end of the piston, said cylinder having an exhaust port to be uncovered by said piston as the latter approaches its limit of inward movement in said cylinder, and means whereby said piston coacts with said carrier cage solely under the influence of differences in gas pressure acting inwardly and outwardly upon the piston to maintain said fuel inlet ports closed against the passage of fuel therethrough to the engine at all times except when said exhaust port is opened by the final portion of the inward movement of said piston.

2. An internal combustion engine consisting of a cylinder, a piston reciprocatively movable within the cylinder, a carrier cage slidably mounted within the piston for limited axial movement, a connecting rod for reciprocatively moving the carrier cage, passages through the tops of the piston and carrier cage arranged to be normally closed by impingement of the one against the other at all times when pressure within the cylinder above the piston is greater than it is below said piston, and a plurality of exhaust ports arranged to be momentarily opened at the limit of the downward movement of the piston and to reduce the pressure within the cylinder above the piston to a point less than the pressure below said piston whereby the carrier cage is pulled away from the top of the piston by the connecting rod during the exhaust period thus opening the passages through the tops of the piston and carrier cage.

3. A two cycle internal combustion engine including, in combination, a cylinder, a hollow piston axially reciprocable in the cylinder and having in its top a fuel inlet port to the cylinder, a hollow carrier cage slidably fitting the wall of the piston and axially reciprocable therein, said carrier cage having at its top a fuel inlet port to the interior of the outer end portion of the piston and also a valve member cooperating with the fuel inlet port in the top of the piston, said cylinder having an exhaust port to be uncovered by said piston as the latter approaches its limit of inward movement in said cylinder, and means whereby said piston is movable outwardly solely by said carrier cage and inwardly solely by a higher gas pressure in the cylinder so that said piston and said carrier cage coact to maintain said fuel inlet ports closed against the passage of fuel therethrough to the engine at all times except when said exhaust port is opened by the final portion of the inward movement of said piston.

4. A two-cycle internal combustion engine comprising a cylinder, a hollow piston axially reciprocable in the cylinder and having in its outer end a fuel inlet port to the cylinder, a hollow carrier cage slidably fitted in said piston and axially reciprocable with respect thereto, said carrier cage having in its outer end a fuel inlet port to the interior of the outer end portion of said position and also having at its outer end a valve member for cooperation with the fuel inlet port in the outer end of the piston, a crank case, means for the controlled admission of gaseous fuel to said crank case to be compressed therein by inward movement of the carrier cage and piston when the inlet port in the top of the piston is closed by said valve member, said cylinder having an exhaust port to be uncovered by said piston as the latter approaches its limit of inward movement in the cylinder, and means whereby said piston is movable outwardly solely by said carrier cage and inwardly solely by a higher gas pressure in the cylinder so that said piston and carrier cage coact to cause said valve member to maintain the fuel inlet port in the outer end of the piston closed at all times except when said exhaust port is opened by the final portion of the inward movement of the piston and the pressure outwardly of the piston thereby becomes lower than the pressure of the gaseous fuel compressed in the crank case.

5. A two-cycle internal combustion engine comprising a cylinder, a crank case, a crank shaft, a hollow piston axially reciprocable in said cylinder and having in its outer end a fuel inlet port to the cylinder, a hollow carrier cage slidably fitted in said piston and axially reciprocable with respect thereto, a rod connecting said carrier cage with said crank shaft, said carrier cage having in its outer end a fuel inlet port to the interior of the outer end portion of said piston and also having at its outer end a valve member for cooperation with the fuel inlet port in the outer end of the piston, and means for the controlled admission of gaseous fuel to said crank case to be compressed therein by inward movement of the carrier cage and piston when the inlet port in the outer end of said piston is closed by said valve member, said cylinder having an exhaust port to be uncovered by said piston as the latter approaches its limit of inward movement in the cylinder, and said piston being mechanically connected with said crank shaft solely through its slidable connection with said carrier cage whereby said piston is held in a position relative to said carrier cage with the valve member of the latter closing the port in the outer end of said piston at all times when the cylinder pressure outwardly of the piston exceeds the crank case pressure and whereby said piston is movable outwardly relative to said carrier cage to open the port in the outer end of the piston and thus admit fuel from the crank case to the cylinder outwardly of the piston only when said exhaust port is opened by the final portion of inward movement of the piston and the cylinder pressure outwardly of the piston thereby becomes lower than the pressure of the gaseous fuel compressed in the crank case.

CLAYTON B. MERRY.